United States Patent
Schumacher

(10) Patent No.: US 8,370,412 B2
(45) Date of Patent: Feb. 5, 2013

(54) METHOD AND APPARATUS FOR GENERATING RANDOM NUMBERS

(76) Inventor: Alain Schumacher, Heisdorf (LU)

( * ) Notice: Subject to any disclaimer, the term of this patent is extended or adjusted under 35 U.S.C. 154(b) by 1075 days.

(21) Appl. No.: 12/294,660

(22) PCT Filed: Mar. 29, 2007

(86) PCT No.: PCT/EP2007/053045
§ 371 (c)(1),
(2), (4) Date: Sep. 26, 2008

(87) PCT Pub. No.: WO2007/113214
PCT Pub. Date: Oct. 11, 2007

(65) Prior Publication Data
US 2010/0241680 A1    Sep. 23, 2010

(30) Foreign Application Priority Data
Mar. 31, 2006  (EP) .................................. 06112142

(51) Int. Cl.
G06F 7/58 (2006.01)
(52) U.S. Cl. ......................... 708/255; 708/250
(58) Field of Classification Search .................. None
See application file for complete search history.

(56) References Cited

U.S. PATENT DOCUMENTS

| | | | |
|---|---|---|---|
| 3,703,727 A | 11/1972 | Knowlton | |
| 4,499,551 A * | 2/1985 | Frank | 708/250 |
| 7,395,288 B2 * | 7/2008 | Fujita et al. | 708/251 |
| 2009/0316898 A1 * | 12/2009 | Omar et al. | 380/255 |
| 2010/0241680 A1 * | 9/2010 | Schumacher | 708/255 |

FOREIGN PATENT DOCUMENTS

| | | |
|---|---|---|
| DE | 3400035 | 7/1984 |
| FR | 2829643 | 3/2003 |
| FR | 2829643 A1 | 3/2003 |
| JP | 59151184 A | 8/1984 |
| JP | 62144243 A | 6/1987 |
| JP | 1067022 A | 3/1989 |

(Continued)

OTHER PUBLICATIONS

Bunker, William Marvin et al. "Simulator for Static Noise" DE 34 00 035 A1, Jul. 12, 1984 (As translated in English by the United States Patent and Trademark Office, Jan. 2012).*

(Continued)

*Primary Examiner* — Lewis A Bullock, Jr.
*Assistant Examiner* — V Miller
(74) *Attorney, Agent, or Firm* — Cantor Colburn LLP

(57) ABSTRACT

A method for generating random numbers mimics by software the principle of coin flipping by combining different sources of randomness. The random number to be generated is assembled bit by bit from the subsequent results of this "coin flipping simulation". The method for generating a random number with $n_{RND}$ bits $BR_i$, wherein $0 \leq i \leq n_{RND}-1$, comprises the steps of • providing a random bit table BFT with $m_{BFT}$ addressable bits $BT_j$, wherein $0 \leq j \leq m_{BFT}-1$, said random bit table containing an equal number of "0" bits and "1" bits in a random distribution, and • for a bit $BR_i$ of said random number with $0 \leq i \leq n_{RND}-1$, generating an address FA in the range between 0 and $m_{BFT}-1$, selecting the bit $BT_{FA}$ having the address FA from said random bit table, and setting said bit $BR_i$ of said random number to equal said bit $BT_{FA}$ from said random bit table ($BR_i = BT_{FA}$).

20 Claims, 4 Drawing Sheets

FOREIGN PATENT DOCUMENTS

JP 4123130 A 4/1992
JP 7134647 A 5/1995

OTHER PUBLICATIONS

Sthele, Jean Luc. "Method for Generating Random Numbers" FR A 2 829 643, Mar. 14, 2003 (As translated in English by the United States Patent and Trademark Office, Feb. 2012).*

Ritter T, The Efficient Generation of Cryptographic Confusion Sequences, Apr. 1, 1991, pp. 81-139, vol. 15, No. 2, Laguna Hills CA.
International Search Report PCT/EP2007/053045; Dated Jul. 16, 2007.
Japanese Office Action issued May 15, 2012 for Japanese Patent Application No. 2009-502097 Citing References: JP62144243; JP7134647; JP1067022.

* cited by examiner

METHOD AND APPARATUS FOR GENERATING RANDOM NUMBERS

TECHNICAL FIELD OF THE INVENTION

The present invention generally relates to a method and an apparatus for generating true random numbers and more specifically to software based method and apparatus for generating such random numbers.

BRIEF DISCUSSION OF RELATED ART

Random numbers are used for a variety of purposes and play key roles in systems such as simulation studies, information processing, communication, and encryption.

Random numbers are often used as the initial inputs or seeds for processes that create other, longer sequences of pseudo-random numbers. Truly random numbers typically are the result of physical processes that cannot be successfully repeated to generate the same sequence of results. For example, the decay of nuclear isotopes, the static created by lightning discharges, or the spurious electrical charges induced by shifts in the earth's magnetosphere could all be used to drive the creation of random numbers that cannot be replicated at another location or at another time.

True random number generators produce outputs that are statistically independent of each other. Thus the compromise of some set of outputs, or of the state of the device at some given time, does not impair the security of random numbers generated in either the past or the future. On the other hand, true random number generators are tricky to design (many designs being dependent on the precise fabrication process); they are hard to test; they may be vulnerable to an opponent who can manipulate chip inputs (such as Vcc); and the rate at which random numbers are generated is usually fairly low.

In order to generate random numbers at higher speed and lower costs, several mathematically based processes have been developed that create pseudo-random numbers that exhibit more or less acceptable randomness characteristics.

These processes can be appropriately labelled pseudo-random number processes since they create results that resemble random numbers, but are not technically random. These processes transform short random seeds into longer pseudo-random number sequences with random number-like characteristics. All of the subsequent pseudo-random numbers are derived strictly from the initial random seeds and from the properties of the processes.

Rapid processing speed is a key advantage of these techniques and the complexity of the calculations in the processes makes the resulting pseudo-random numbers sequences extremely difficult to predict. However, no new "randomness" is introduced into the processes once the initial random seeds have been provided.

BRIEF SUMMARY OF THE INVENTION

The invention provides a software-based method for generating high quality random numbers.

This method is based on the principle that flipping a "fair" coin is a Bernoulli trial with exactly 50% probability to get a 0-bit or a 1-bit (corresponding to head or tail). The decisive fact in coin flipping is the independence of the next outcome from the previous results. By combining different sources of randomness the presently presented method mimics by software the principle of coin flipping.

In a very general way, the outcome of the coin flipping is reproduced by the presently presented method by randomly selecting one bit from a random bit table, such as the random bit table 100 illustrated in FIG. 1, which contains an equal number of "0" bits and "1" bits in a random distribution. The random number to be generated is then assembled bit by bit from the subsequent results of this "coin flipping simulation" as illustrated in FIG. 4. For example, referring to FIG. 4, in block 401, a bit is randomly selected from the random bit table 100. In block 402, the bit is added to a random number table 100. In block 403, it is determined whether the last bit of the random number has been selected. If not, a next bit of the random number is selected in block 401. Consequently the method for generating a random number with nRND bits BRi, wherein $1 \leq i \leq nRND$, comprises the steps of:

a) providing a static bit table 100 (BFT) with mBFT addressable bits BTj, wherein $0 \leq j \leq mBFT-1$, said static bit table 100 containing an equal number of "0" bits and "1" bits in an arbitrary distribution, and b) for a bit BRi of said random number with $1 \leq i \leq nRND$, generating an address FA in the range between 0 and mBFT−1, selecting the bit BTFA having the address FA from said static bit table 100, and setting said bit BRi of said random number to equal said bit BTFA from said static bit table (BRi=BTFA).

The static bit table named Bit-Fishing-Table BFT may be a one-dimensional bit-table filled randomly with equal numbers of "0" and "1" bits. The random bits in the BFT form the basis for the "endless" variations and the unpredictability of the produced random number output of the present method. The random bit table BFT itself may be randomly generated by any suitable method which leads to a random distribution of the "0" and "1" bits, including by a method as presented in the present application.

The dimension (total of the random bits) depends on the type of application. For implementation reasons, the dimension is preferably chosen as an exponent of 2 in a range between 65536 bits (corresponding to 8 Kbyte) and 4294967296 bits (corresponding to 512 Mbyte). The latter limit is considered to constitute the technical limit in a 32-bit processor architecture.

For crypto applications the 8 KB, 16 KB, 32 KB and 64 KB versions are of special interest, as they fit easily into the secured memories of smart cards or USB tokens. As the BFT is the determining element for the randomness of the generated numbers, the BFT, and not the seed, is the only element to be held secret in crypto applications. It will be appreciated that a "secret" of only 8 KB may be sufficient for top secured applications.

In fact, among the $2,003529\ldots*10^{19728}$ possible tables of 8 KB ($2^{65535}$), there are $6,244451\ldots*10^{19725}$ different tables with 32768 "0" bits and 32768 "1" bits. Thus for a given BFT of 8 KByte, one would have to produce approximately $10^{141}$ tables before one would find one with 55% or more identical bits compared to the original. To find one with 60% or more identical bits, one would have to produce approximately $10^{572}$ tables, and to come up to 70% identical bits, one would have to produce some $10^{2341}$ tables, and so on. If we suppose that the population on earth will reach 100 billion people, and that everybody will need one table per second, the odds are very, very strong that in 1000 years, we will not see two tables having 55% or more identical bit-positions. Indeed, as the probability is 1 to $10^{141}$ to get a table with 55% or more bit-positions identical to a given table, we need more than $10^{70}$ tables to find two tables with more than 55% identical bits, by applying the so-called "birthday-paradox". Considering that the total number of produced tables in 1000 years would sum up to $3,153*10^{21}$, the odds are indeed very, very strong.

The method according to the present invention efficiently transforms this enormous potential of a simple 8 Kbyte secret table into billions of billions of unpredictable and well distributed random numbers.

It should be noted that the present method proceeds bit-position by bit-position in order to generate random numbers. It follows that the length $n_{RND}$ of the random number to be generated can be chosen to equal any number suitable for a specific application.

The address FA of the bit to be selected from the static bit table BFT may be randomly generated by any suitable method that ensures a high quality randomness of the address within the given range. In a preferred embodiment of the invention said step of generating an address FA includes the steps of
a) providing a number q of basic randomness values BRV, each basic randomness value BRV having a length of l bits
b) extracting selected ones of the l bits of each of said q basic randomness values BRV and assembling said address FA from said selected bits.

In a possible embodiment, as illustrated in FIG. 3, there are 4 basic randomness values BRV1 to BRV4, i.e. q=4, each having a length of 32 bits, i.e. l=32. The final address is then an assembly of different bit positions from the four BRVs.

In order to get well distributed random numbers, the final addresses FA produced also have to be randomly distributed over the whole address space of the Bit-Fishing-Table BFT. In order to ensure the randomness of the produced addresses, the step of extracting selected ones of the l bits of said q basic randomness value BRV preferably comprises the step of executing an "AND"-operation (see AND logic 302) of each of said q basic randomness value BRV and a selected one of a plurality of predetermined specific final address assembly parameters 301 (FAAP), and the step of assembling said address FA from said selected bits comprises the step of transferring the results of said "AND"-operations into a final address register 303.

In a preferred embodiment said final address parameters FAAP are configured such that for each bit $BR_i$ of the random number to be generated, the number $p_{FA}$ of bits selected from each basic randomness value BRV for assembling said address FA is identical $$\left(p_{FA} = \frac{m_{BFT}}{q}\right)$$

and that after the generation of $$\frac{l}{p_{FA}}$$

bits $BR_i$ of the random number, each one of said l bits of a basic randomness value BRV has been selected exactly once. This means that the FAAPs are determined such that each bit of said basic randomness values BRV is only used once and that after a predetermined number of executions, all the bits of each BRV are used once and only once.

In the exemplary embodiment described above, the final address assembly parameters FAAP are e.g. 16 special values (4 groups of 4) used to assemble the final BFT-address for "fishing" the next bit. These 16 values may be arranged in 4 columns A, B, C, D and four rows 1, 2, 3, 4.

To assemble the final address FA in order to determine the next bit $BR_i$ to extract from the BFT, one uses the four parameters from one column (A1, A2, A3, A4). In the next cycle, i.e. during the generation of the FA of the next bit BR, the method will use the four parameters from the B line, then C and D. The FAAP well calculated will guarantee that every bit of the address is assembled properly.

The FAAP values are chosen such that every BRV will participate in the address-assembling with different bits during 4 cycles. It is very important that the FAAP values are determined such that the same bit of a BRV is never used twice, otherwise the good distribution of the random numbers produced will be in danger. Having one bit per position in the 4 parameters per row fulfils this.

The FAAP values may be predetermined arbitrarily as a given table (that looks "very random") and included in the program instructions. Alternatively these FAAP values may be randomly generated tables in case we want to use a random FAAP table as secret session key in crypto applications.

The basic randomness values BRV are preferably computed by generating a pseudo-random number PRND; by providing at least one feedback modifier value FBM, said feedback modifier being influenced by a predetermined number of previously generated bits $BR_i$, and by executing an XOR-operation of at least a part of said generated pseudo-random number with said at least one feedback modifier FBM.

The pseudo-random number PRND may e.g. be generated by a linear congruential generator and have a length of $l_{PRND}$ bits and the at least one feedback modifier FBM may have a length of l bits, $l_{PRND} \geq l$. In this case, the generation of the basic randomness values BRV may comprise the XOR-operation of the last l bits of said generated pseudo-random number PRND with said at least one feedback modifier FBM.

In a preferred embodiment of the method, a plurality of feedback modifiers are used for the creation of the basic randomness values. The method may e.g. use a table of four 32-bit values (FBM1 to FBM4) for the creation of the BRVs.

The feedback modifiers should be influenced by a predetermined number of previously generated bits BRi, e.g. of the last 32 bits produced. For this reason, the feedback modifiers FBM are preferably generated by executing an XOR-operation of a predetermined 32-bit long basic modifier value BM with the last 32 generated bits $BR_i$. In a possible implementation of the method, the feedback modifiers FBM are generated by executing an XOR-operation of one of a plurality of predetermined l-bit long basic modifier values BM with the last l previously generated bits $BR_i$, wherein after each generation of a feedback modifier, the basic modifier values BM of said plurality of basic modifier values BM are cyclically permuted. The basic modifiers may e.g. consist of a table of 16 unsigned 32-bit integers BM1 to BM16.

The feedback of the last 32 bits produced is influencing the value of the generated FBM, but does not determine the value itself. Nevertheless we use the expression "feedback" to indicate that the last 32 bits generated influence the calculation of these values.

In a preferred embodiment of the method, the feedback modifiers FBM are periodically renewed, e.g. every time the requested random number of 8, 16, 24 or 32 bits is terminated. This may e.g. be achieved by transferring feedback modifiers FBM3 to FBM4, FBM2 to FBM3, FBM1 to FBM2 and by creating a new FBM1 by XOR-ing the next BM with the last 32 bits generated. After using the BM16, the next cycle begins again with the BM1.

The basic modifiers BM may be generated during an initialization step of the method. The recommended way for the calculation of these values is to alternately fill blocks of two values, one block with an LCG 64-bit pseudo-random number XOR-ed with randomly fished bits of the BFT to guarantee the best secrecy of these values, and one block with unmodified LCG random numbers to guarantee the uniqueness for any given seed out of the $2^{64}$ possible ones.

The method of the present invention may be easily implemented on any standard computer, such as e.g. a simple personal computer. Accordingly the present invention also relates to a computer program comprising program code for performing all the steps of the described method for generating random numbers or to a computer program product stored on a computer usable medium, which comprises instructions operable to cause a programmable processor, such as the processor 201 of FIG. 2, to carry out a method for generating a random number as disclosed above.

Furthermore the invention also relates to a computer device, such as the computer device 200 of FIG. 2, comprising memory means 202 having program code stored therein for performing all the steps of the proposed method and an execution environment for executing said program code so as to carry out said method. In a preferred embodiment, the computer device may further comprise means for amending one or more initial parameters (e.g. the seed) for said method at each power-up. Such a computer device, which should preferably have the random bit table BFT 203 stored on the same chip in a secured memory would represent the famous black box for producing unpredictable random numbers which cannot be reproduced.

BRIEF DESCRIPTION OF THE DRAWINGS

Referring now to the drawings.

DETAILED DESCRIPTION OF THE INVENTION

Figure 1:
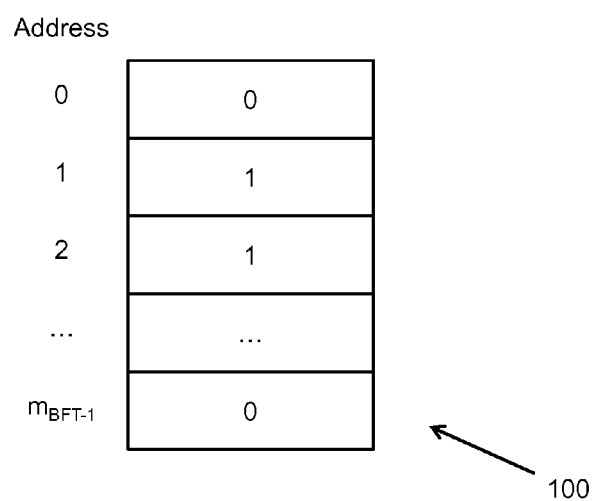
FIG. 1 illustrates a random bit table according to one embodiment of the invention.
Figure 2:
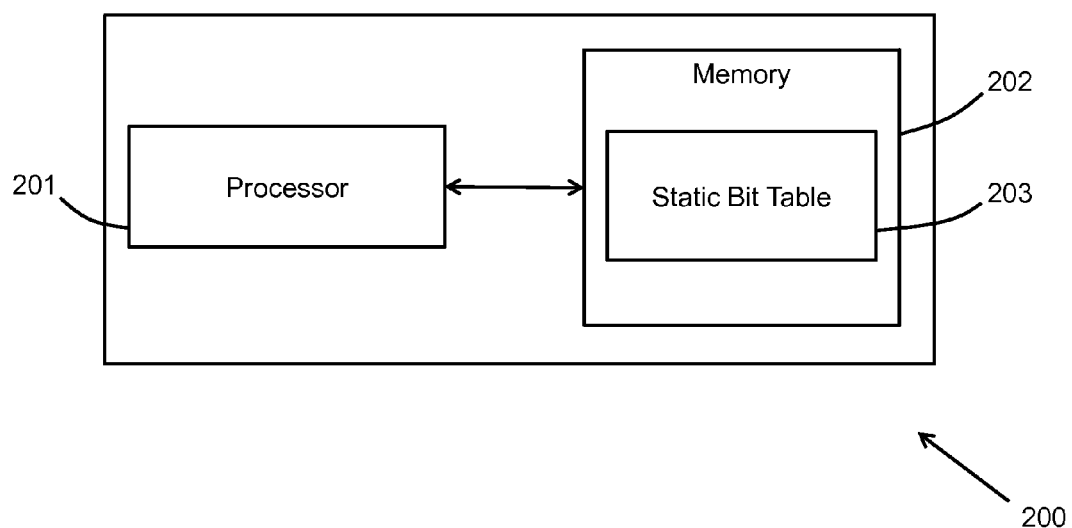
FIG. 2 illustrates a computer device according to one embodiment of the invention.
Figure 3:
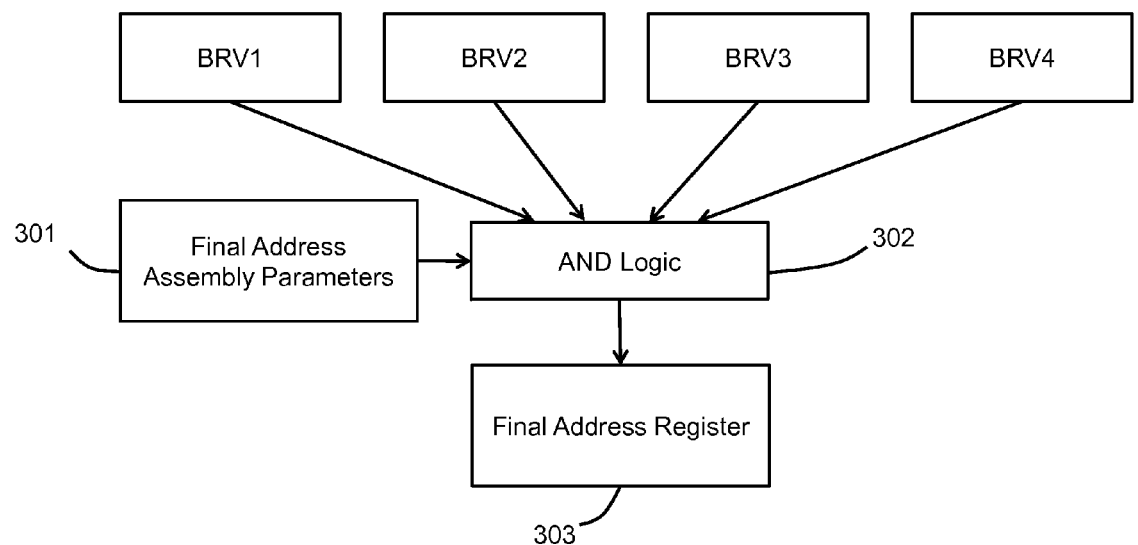
FIG. 3 illustrates the assembly of a random number according to one embodiment of the invention.
Figure 4:
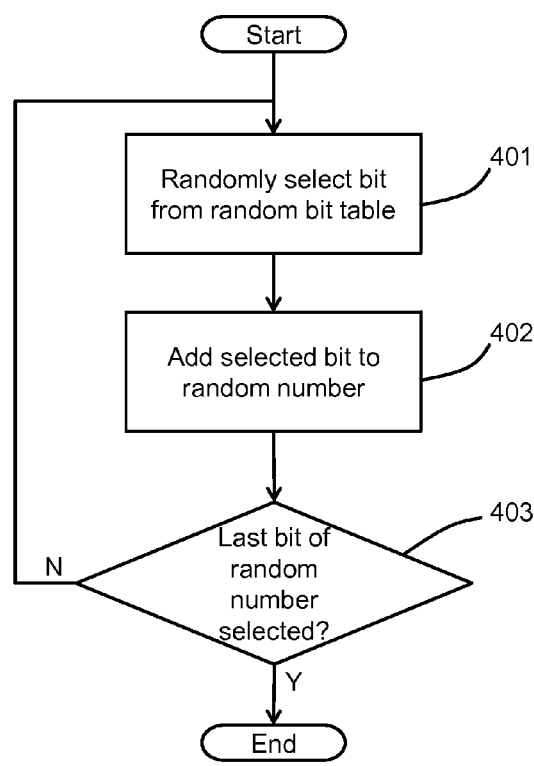
FIG. 4 is a flowchart illustrating a process of assembling a random number accord- ing to one embodiment of the invention.

The present invention will be more apparent from the following description of a preferred embodiment of a method for generating random numbers.

In order to get any of the theoretically possible combinations for a bit-string of a given length (including the last one produced) with the same probability, we have to abandon the arithmetical approach of the existing pseudo-random number generators. The basic "endless" possibilities of the method according to the present invention come mainly from a random table named Bit-Fishing-Table (BFT).

The size of this table, normally a number of bits of an exponent of 2, may vary from as small as 8 Kbyte to a technical limit (for 32-bit processors) of 512 Megabyte. The table must have an equal number of one- and zero-bits to guarantee the same probability for the production of ones and zeros. To guarantee a maximum of unpredictability, the table has to be of a good random quality.

To generate the random numbers, the proposed method processes bit-position by bit-position, with a 50% probability to get a one or a zero. The first step per bit is to produce (by combining different sources of randomness) a random address FA in the range of the size of the BFT, and the second step is to take this bit from the random table and to add it to the random number under construction.

To operate the method in the first instance, one may use a classical pseudo-random number generator LCG, in a 64-bit version. It should be noted, that the classical linear congruential generator is solely used for operating the new method, but that the output of the proposed method is in no way correlated with the random numbers produced by the LCG. The main characteristic of this LCG is the fact that $2^{64}$ different and unique values of 64 bit show up in a random, but predictable order. These facts, against the principles of true randomness, are used advantageously in the proposed method to guarantee the uniqueness of strings from minimum $2^{64}$ bits per seed. Thereby one can be sure to get a minimum production of at least, without any other possible interventions, $2^{128}$ bits per individual Bit-Fishing-Table BFT (as we have $2^{64}$ possible seeds, and every seed will produce different random-strings of at least $2^{64}$ bits).

The seeding procedure is the initial part of the proposed method and needs a few hundreds of the first pseudo-random values produced by the LCG. The seeding procedure has to fulfil two different goals. The first goal is to calculate the values for the 16 basic modifiers (BM). These basic modifiers are calculated by combining in 8 registers some information from the LCG and the BFT, and in the other 8 registers the unmodified values from the LCG. By combining LCG and BFT one can exclude the possibility to guess the values from these registers by knowing the seed, and by letting unmodified the other half we guarantee the uniqueness per seed. These values will stay unmodified up to the next reseeding.

The second goal is to "fill the pipe". This means that we calculate randomly, by extracting bits from the BFT with the help of the LCG pseudo-random numbers, the starting values for different registers needed in the normal production cycle. This concerns the four 32-bit feedback modifiers (FBM), the four 32-bit basic-randomness-values (BRV) and the register with the last 32 bits produced.

As optional speed-optimization strategy one might fill as well a 32-bit register with a random value to be considered as chosen part of the BFT in the first cycle. In the first production cycle we use this one and we start the request for the next one to be used in the second cycle, always one cycle in advance. By doing so we partly avoid nasty delays in accessing the BFT in the memory, as the processor can do some work during the waiting period.

Once this seeding procedure is finished, we can start "flipping the coin". The basic cycle of the proposed method is the production of 4 bits. This is due to the method used for the calculation of the final address of the bit to be selected from the BFT. In an actual implementation one may, for speed optimization, chain two basic cycles to generate 8 bit numbers in one round.

The production of one bit goes as follows:
we calculate the next LCG number
we recalculate one BRV (cyclically one of the four) by XOR-ing the upper 32 bits from the LCG with one FBM (cyclically one out of the four)
we transfer, by an "AND" instruction, selected bits, defined in a specific Final-Address-Assembling-Parameter (FAAP), from the BRV1 to the Final-Address (FA) register
we add, based on the next FAAP, some bits from the BRV2
idem from BRV3
idem from BRV4
after these operations we have the address of the bit to extract from the BFT, and we will add this bit to the random number under construction.

After executing one, two, three or four times the production of 8 bits (for an 8 bit, 16 bit, 24 bit or 32 bit unsigned integer), we have to leave this main-cycle to update the table of the FBMs. We transfer FBM3 to FBM4, FBM2 to FBM3 and FBM1 to FBM2. The FBM1 is recalculated by XOR-ing the last 32 bits produced with a Basic Modifier (BM) determined in a cyclic way.

The next production cycle for 1, 2, 3 or 4 bytes may now start again. If high-speed production of larger quantities of random numbers is needed, it is recommended to produce 32 bits at a time. On the other hand the reader will easily understand from these explications that changing from one request of 32 bits to two requests of 16 bits in a random way (based maybe on the time-clock or the elapsed time) allows us to produce non-reproducible random numbers, as we advance differently in the Basic-Modifier cycle, and as the last 32-bit register will not be the same. For this possibility we use the term run-time randomness.

As explained we will get $2^{64}$ different bit-strings (one per different seed of the LCG) of $2^{64}$ bits each. For different BFTs we will get of course completely different strings.

One might argue that this means to have only, for a given table and per seeding, some $2^{58}$ 64-bit integers before the method runs out of the period of the LCG. Effectively, after the first cycle of the LCG, there exists a small possibility that one may enter by chance in the same state of the FBMs.

But this is not a problem one has to worry about. First, it is easy to calculate that even with a production of 1 billion 64-bit integers per second we have to wait more than 9 years before this will happen. Secondly, in case we may encounter this problem one day, we can force an automatic new seeding after the production of $2^{64}$ bits. If we want to produce large amounts of random numbers by parallel-processing on a multiprocessor-system, we can chose to take a different BFT per processor, or to take one BFT and use a different seed per processor.

Other possibilities exist too, like the run-time randomness or the automatic changing of the FAAPs etc, so it is believed that it is not appropriate to try to calculate a periodicity as we would need to do if we worked with PRGNs. The proposed method will offer for every speed the possibility to produce never seen random numbers (if we consider 256 bit-length) and never repeating, limited only by the basic laws of probability. We may get them as reproducible or as non-reproducible as we want them to be. For truly non-reproducible random numbers for crypto applications it would be recommended to use a specially designed microcomputer which increases the seed automatically at every power-up, and has a secret BFT stored on the same chip in a secured memory, unreadable from outside. Such a microcomputer would represent the famous black box for producing unpredictable random numbers which cannot be reproduced.

Concerning the achievable speed, we have measured up to 124 Megabit per second (that is 15.5 Megabyte per second) with an 8 KB BFT and 115 Megabit per second with a 64 KB BFT, on an Intel Pentium 4 with 64 bit EMT at 3 GHz. On a small ARM 9 running at 180 MHz the rate obtained was 1.3 Megabit per second. The programming language is C-99, without hand-coded assembler optimization.

Due to the differences in the access speed between the caches and the main memory, the speed decreases rapidly if we use very large BFTs.

In conclusion, the present invention proposes a software based method for generating high quality random numbers having the characteristics of true random numbers. The method thus allows the production of true random numbers on any standard computer.

In contrast to most known pseudo-random generators, the random numbers generated by the proposed method are completely unpredictable both in a forward and a backward direction. Except for specially designed pseudo-random bit generators for cryptographic applications, the PRNGs produce random numbers which are forward and backward predictable. As the random numbers are the result from a mathematical function, knowing one small sequence of the numbers allows you to calculate the previously produced and the next sequence to come up.

Based on the concept of the Bit-Fishing-Table, the proposed method enables to generate random numbers, for which it is absolutely impossible to calculate, based on the knowledge of one part of the sequence, the unknown string before or behind the known part, as long as the bit-fishing-table is secret.

If somebody knows the BFT, but not the seed, he is not able to calculate the seed, but he will have to try out maybe all of the $2^{64}$ possible seeds to find the one used. If you know the seed and the BFT, but don't have the FAAP values, in case that we use randomly calculated FAAPs, then you will need to try out all the billions of billions of possible FAAPs.

Furthermore all of the PRNGs have in principle a periodicity, after which they start to repeat the same random numbers. This is due to the mathematical function used in the PRNGs. For a classical 32-bit LCG we may prove in practice this fact in a few minutes on a modern desktop computer, while for a 48-bit or 64-bit version this task will be more difficult, due to the much longer period. For the proposed method we are not concerned with this problem. Every version of the BFT will guarantee a unique production of $2^{64}$ different strings of the length of $2^{64}$. As indicated in the description above, there exist different possibilities to exceed these values, i.e. run-time randomness and the change of the FAAPs. The easiest way to extend the method to exceed the length of $2^{64}$ bits to produce, is the automatic new seeding with the old seed plus one. This simple change in the seeding extends the number of different strings to $2^{128}$.

"The outputs of a PRNG are typically deterministic functions of the seed; i.e., all true randomness is confined to seed generation. The deterministic nature of the process leads to the term "pseudo-random". Since each element of a pseudo-random sequence is reproducible from the seed, only the seed needs to be saved if reproduction or validation of the pseudo-random sequence is required," (point 1.1.4. paragraph 2 of the NIST Special Publication 800-22 A statistical test suite for random and pseudo-random number generators for cryptographic applications). In the case of the presently proposed method the seed plays a role, but not the major one, and absolutely not the only one. The main source of randomness is the bit-fishing-table (BFT), and the seed, the FAAPs and the possible outside randomness introduced during the run of the generator by the run-time randomness are supplementary sources of randomness.

The invention claimed is:

1. A method for encrypting data by generating a random number with $n_{RND}$ bits $BR_i$, wherein $1 \leq i \leq n_{RND}$, said method comprising the steps of
   a) providing in memory a static bit table (BFT) with $m_{BFT}$ addressable bits $BT_j$, wherein $0 \leq j \leq m_{BFT}-1$, said static bit table containing an equal number of "0" bits and "1" bits in a random distribution, and
   b) for a bit $BR_i$ of said random number with $1 \leq i \leq n_{RND}$
      i. generating, by a processor, an address FA in the range between 0 and $m_{BFT}-1$, wherein said step of generating an address FA includes the steps of:
         A) providing a number q of basic randomness values BRV, each basic randomness value BRV having a length of l bits B) extracting selected ones of the l bits of each of said q basic randomness values BRV and assembling said address FA from said selected bits, said step of extracting selected ones of the l bits of said q basic randomness value BRV comprises the step of executing an "AND"-operation of each of said q basic randomness value BRV and a selected one of a number of predetermined specific final address assembly parameters FAAP, and wherein the step of assembling said address FA from said selected bits comprises the step of transferring the results of said "AND"-operations into a final address register, ii. selecting, by the processor, the bit $BT_{FA}$ having the address FA from said static bit table, and iii. setting, by the processor, said bit $BR_i$ of said random number to equal said bit $BT_{FA}$ from said static bit table ($BR_i = BT_{FA}$); and c) encrypting said data with said random number.

2. The method according to claim 1, wherein said final address parameters FAAP are configured such that for each bit $BR_i$ of the random number to be generated, the number $p_{FA}$ of bits selected from each basic randomness value BRV for assembling said address FA is identical.

3. The method according to claim 2, wherein said final address parameters FAAP are configured such that after the generation of $$\frac{l}{p_{FA}}$$

bits $BR_i$ of the random number, each one of said l bits of a basic randomness value BRV has been selected exactly once.

4. The method according to claim 1, wherein said basic randomness values BRV are generated by a) generating a pseudo-random number PRND;

b) providing at least one feedback modifier value FBM, said feedback modifier being influenced by a predetermined number of previously generated bits $BR_i$, and c) executing an XOR-operation of at least a part of said generated pseudo-random number with said at least one feedback modifier value FBM.

5. The method according to claim 4, wherein the pseudo-random number PRND generated in step a) has a length of $l_{PRND}$ bits and is generated by a linear congruential generator, $l_{PRND} \geq 1$;

wherein said at least one feedback modifier value FBM provided in step b) has a length of l bits, and wherein the at least a part of said generated pseudo-random number used in the XOR-operation of step c) are the last l bits of said generated pseudo-random number PRND.

6. The method according to claim 4, wherein said at least one feedback modifier value FBM is generated by executing an XOR-operation of a predetermined l-bit long basic modifier value BM with the last l previously generated bits $BR_i$.

7. The method according to claim 4, wherein said at least one feedback modifier value FBM is periodically renewed.

8. The method according to claim 6, wherein said at least one feedback modifier value FBM is generated by executing an XOR-operation of one of a plurality of predetermined l-bit long basic modifier values BM with the last l previously generated bits $BR_i$, and wherein after each generation of a feedback modifier, the basic modifier values BM of said plurality of basic modifier values BM are cyclically permuted.

9. The method according to claim 6, wherein said basic modifier value BM is generated during an initialization step of the method by alternatively filling blocks of two values, one block with the result of an XOR-operation of a generated pseudo-random number with randomly selected bits of said static bit table (BFT) and one block with an unmodified generated pseudo-random number.

10. A non-transitory computer usable medium having a computer program stored thereon, said computer program comprising instructions operable to cause a programmable processor to carry out a method for encrypting data by generating a random number, the method comprising:

a) providing in memory a static bit table (BFT) with $m_{BFT}$ addressable bits $BT_j$, wherein $0 \leq j \leq m_{BFT}-1$, said static bit table containing an equal number of "0" bits and "1" bits in a random distribution, and b) for a bit $BR_i$ of said random number with $1 \leq i \leq n_{RND}$ i. generating, by a processor, an address FA in the range between 0 and $m_{BFT}-1$, wherein said step of generating an address FA includes the steps of:

A) providing a number q of basic randomness values BRV, each basic randomness value BRV having a length of l bits B) extracting selected ones of the l bits of each of said q basic randomness values BRV and assembling said address FA from said selected bits, and, said step of extracting selected ones of the l bits of said q basic randomness value BRV comprises the step of executing an "AND"-operation of each of said q basic randomness value BRV and a selected one of a number of predetermined specific final address assembly parameters FAAP, and wherein the step of assembling said address FA from said selected bits comprises the step of transferring the results of said "AND"-operations into a final address register ii. selecting, by the processor, the bit $BT_{FA}$ having the address FA from said static bit table, and iii. setting, by the processor, said bit $BR_i$ of said random number to equal said bit $BT_{FA}$ from said static bit table ($BR_i = BT_{FA}$), and c) encrypting said data with said random number.

11. A computer device comprising:

a memory having program code stored therein for performing a method for encrypting data by generating a random number, and an execution environment including a processor for executing said program code so as to carry out said method, comprising:

a) providing in memory a static bit table (BFT) with $m_{BFT}$ addressable bits $BT_j$, wherein $0 \leq j \leq m_{BFT}-1$, said static bit table containing an equal number of "0" bits and "1" bits in a random distribution, and b) for a bit $BR_i$ of said random number with $1 \leq i \leq n_{RND}$ i. generating, by a processor, an address FA in the range between 0 and $m_{BFT}-1$, wherein said step of generating an address FA includes the steps of:

A) providing a number q of basic randomness values BRV, each basic randomness value BRV having a length of l bits B) extracting selected ones of the l bits of each of said i basic randomness values BRV and assembling said address FA from said selected bits, and said step of extracting selected ones of the l bits of said q basic randomness value BRV comprises the step of executing an "AND"-operation of each of said q basic randomness value BRV and a selected one of a number of predetermined specific final address assembly parameters FAAP, and wherein the step of assembling said address FA from said selected bits comprises the step of transferring the results of said "AND"-operations into a final address register, ii. selecting, by the processor, the bit $BT_{FA}$ having the address FA from said static bit table, and iii. setting, by the processor, said bit $BR_i$ of said random number to equal said bit $BT_{FA}$ from said static bit table ($BR_i = BT_{FA}$), c) encrypting said data with said random number.

12. A computer device according to claim 11, further comprising amending, by the processor, one or more initial parameters for said method at each power-up.

13. The method according to claim 11, wherein said final address parameters FAAP are configured such that for each bit $BR_i$ of the random number to be generated, the number $p_{FA}$ of bits selected from each basic randomness value BRV for assembling said address FA is identical.

14. The method according to claim 13, wherein said final address assembly parameters FAAP are configured such that after the generation of $$\frac{l}{p_{FA}}$$

bits $BR_i$ of the random number, each one of said l bits of a basic randomness value BRV has been selected exactly once.

15. The method according to claim 11, wherein said basic randomness values BRV are generated by I) generating a pseudo-random number PRND;

II) providing at least one feedback modifier value FBM, said feedback modifier being influenced by a predetermined number of previously generated bits $BR_i$, and III) executing an XOR-operation of at least a part of said generated pseudo-random number with said at least one feedback modifier value FBM.

16. The method according to claim 15, wherein the pseudo-random number PRND generated in step I) has a length of $l_{PRND}$ bits and is generated by a linear congruential generator, $l_{PRND} \geq l$;

wherein said at least one feedback modifier value FBM provided in step II) has a length of l bits, and wherein the at least a part of said generated pseudo-random number used in the XOR-operation of step III) are the last l bits of said generated pseudo-random number PRND.

17. The method according to claim 15, wherein said at least one feedback modifier value FBM is generated by executing an XOR-operation of a predetermined l-bit long basic modifier value BM with the last l previously generated bits $BR_i$.

18. The method according to claim 17, wherein said at least one feedback modifier value FBM is generated by executing an XOR-operation of one of a plurality of predetermined l-bit long basic modifier values BM with the last/previously generated bits $BR_i$, and wherein after each generation of a feedback modifier, the basic modifier values BM of said plurality of basic modifier values BM are cyclically permuted.

19. The method according to claim 17, wherein said basic modifier value BM is generated during an initialization step of the method by alternatively filling blocks of two values, one block with the result of an XOR-operation of a generated pseudo-random number with randomly selected bits of said static bit table (BFT) and one block with an unmodified generated pseudo-random number.

20. The method according to claim 15, wherein said at least one feedback modifier value FBM is periodically renewed.

* * * * *